United States Patent
Ziv

(10) Patent No.: US 11,571,047 B2
(45) Date of Patent: Feb. 7, 2023

(54) LATCHING MECHANISM

(71) Applicant: Hornling Industrial Inc., Tainan (TW)

(72) Inventor: Avraham Ziv, Calabasas, CA (US)

(73) Assignee: Hornling Industrial Inc., Tainan (TW)

( * ) Notice: Subject to any disclaimer, the term of this patent is extended or adjusted under 35 U.S.C. 154(b) by 0 days.

(21) Appl. No.: 17/321,675

(22) Filed: May 17, 2021

(65) Prior Publication Data

US 2021/0378366 A1 Dec. 9, 2021

Related U.S. Application Data

(60) Provisional application No. 63/033,936, filed on Jun. 3, 2020.

(51) Int. Cl.
*B60R 22/18* (2006.01)
*A44B 11/25* (2006.01)

(52) U.S. Cl.
CPC ...... *A44B 11/2557* (2013.01); *A44B 11/2561* (2013.01); *Y10T 24/2168* (2015.01)

(58) Field of Classification Search
CPC ............ A44B 11/2557; A44B 11/2553; A44B 11/2561; B60R 2022/1812; Y10T 24/2168
See application file for complete search history.

(56) References Cited

U.S. PATENT DOCUMENTS

| | | |
|---|---|---|
| 4,588,207 A | 5/1986 | Doty |
| 5,138,749 A | 8/1992 | McCune et al. |
| 5,309,606 A * | 5/1994 | Kawamura ........ A44B 11/2557 24/171 |
| 5,548,874 A | 8/1996 | Mishina et al. |
| 5,983,462 A | 11/1999 | Roeck |
| 10,981,536 B2 | 4/2021 | Wang |
| 11,007,973 B2 | 5/2021 | Wang |
| 2008/0168634 A1* | 7/2008 | Chen .................. A44B 11/2553 24/633 |
| 2010/0244541 A1 | 9/2010 | Dennis et al. |
| 2013/0341994 A1 | 12/2013 | Boughner et al. |
| 2019/0263350 A1 | 8/2019 | Ruthinowski et al. |

FOREIGN PATENT DOCUMENTS

| | | |
|---|---|---|
| CN | 205385916 U | 7/2016 |
| EP | 3620076 A1 | 3/2020 |
| JP | H07304416 A | 11/1995 |
| TW | I673020 B | 10/2019 |
| TW | I7321675 B | 5/2021 |

* cited by examiner

*Primary Examiner* — Robert Sandy
*Assistant Examiner* — Michael S Lee
(74) *Attorney, Agent, or Firm* — Karin L. Williams; Alan D. Kamrath; Mayer & Williams PC

(57) ABSTRACT

A latching mechanism is applied to be mounted on a webbing of a seat belt system. The latching mechanism has a tongue assembly and a slider mounted on the tongue assembly. The slider has a bridge located at a side of the tongue assembly. The webbing passes through a bottom end of the bridge and is inserted through the slider and the tongue assembly. The webbing has a shoulder belt located at a side, which has the bridge, of the latching mechanism. When the slider is located in an unlocked position, the latching mechanism is capable of freely moving along the webbing. A tension of the shoulder belt acts on the bridge for driving the slider to move from the unlocked position to a locked position, such that the webbing is clamped and locked by the slider and the tongue assembly.

11 Claims, 14 Drawing Sheets

LATCHING MECHANISM

BACKGROUND OF THE INVENTION

1. Field of the Invention

The present invention relates to a latching mechanism, and more particularly to a latching mechanism that is applied to a seat belt system in a vehicle, is mounted on a webbing of the seat belt system, and is locked by a buckle mounted beside a seat.

2. Description of Related Art

For protecting every occupant seated in a vehicle, a seat belt system is mounted adjacent to a seat in the vehicle. In a conventional three-point seat belt system, a webbing of the seat belt system pulled out from a retractor mounted on a side of the seat extends upwardly, passes through a guiding ring mounted on a side wall of the vehicle, and then extends downwardly to a site where a conventional latching mechanism is mounted. A buckle is mounted on another side of the seat opposite the latching mechanism. In use, when the occupant is seated and fastens the webbing, the conventional latching mechanism is inserted into and is locked by the buckle. A shoulder belt of the webbing is obliquely passed a shoulder and a front chest of the occupant, and a lap belt of the webbing is transversely passed a waist of the occupant for protecting the occupant.

The conventional latching mechanism has an inserting portion and a guide portion located on a top end of the inserting portion. The webbing passes through a webbing receiving aperture of the guide portion. The inserting portion is inserted into and is locked by the buckle. The conventional latching mechanism only facilitates passing and connecting of the webbing without any locking function between the latching mechanism and the webbing. In the present technology, a slider is further mounted on the conventional latching mechanism for facilitating relative sliding between the slider and a tongue assembly of the conventional latching mechanism. Under the tension of the lap belt acting on a back plate of the slider, the slider moves from an unlocked position to a locked position, and the webbing is clamped between the slider and the conventional latching mechanism.

Although the conventional latching mechanism combining the tongue assembly and the slider can be mounted on the webbing for locking the webbing, after the conventional latching mechanism is mounted on the webbing, the back plate of the slider is pushed by the tension exerted on the lap belt of the webbing, and the slider is pushed upwardly for moving to the locked position. When the vehicle is riding on an uneven terrain, the tension exerted on the lap belt of the webbing changes as the occupant's body shakes. Sometimes the tension exerted on the lap belt decreases or vanishes instantaneously, recovering the slider to the unlocked position and unlocking the webbing. The webbing locking function of the conventional latching mechanism is thus lost. Before the tension exerted on the lap belt of the webbing is restored and the slider locks the webbing, part of the webbing may pass through the conventional latching mechanism, and then the seat belt system loosens its fastening on the occupant. Considering the safety requirements on the seat belt system, it is necessary to improve a webbing locking structure of the conventional latching mechanism.

To overcome the shortcomings, the present invention provides a latching mechanism to mitigate or obviate the aforementioned problems.

SUMMARY OF THE INVENTION

The objective of the invention is to provide a latching mechanism that can solve the problems of the conventional latching mechanism including that the tension exerted on the lap belt of the webbing changes with shaking of the occupant's body, and decreases or vanishes instantaneously, restoring the slider to the unlocked position and unlocking the webbing, and before the tension exerted on the lap belt of the webbing is restored and the slider locks the webbing, part of the webbing may pass through the conventional latching mechanism, such that the seat belt system loosens its fastening on the occupant.

The latching mechanism is applied to be mounted on a webbing of a seat belt system. The latching mechanism has a tongue assembly and a slider mounted on the tongue assembly. The slider is moveable upwardly and downwardly and has a bridge located at a side of the tongue assembly. The webbing passes through a bottom end of the bridge and is inserted through the slider and the tongue assembly. The webbing has a shoulder belt located at a side, which has the bridge thereon, of the latching mechanism. When the slider is in an unlocked position of the tongue assembly, the latching mechanism is capable of freely moving along the webbing. A tension of the shoulder belt acts on the bridge for driving the slider to move from the unlocked position of the tongue assembly to a locked position of the tongue assembly, which makes the webbing clamped and locked by the slider and the tongue assembly.

When the latching mechanism is applied to the seat belt system in a vehicle, the latching mechanism is mounted on the webbing and configured to be fastened with and unfastened from the buckle. The latching mechanism has the tongue assembly and the slider sliding relative to the tongue assembly, the webbing is inserted through the tongue assembly and the slider, and the latching mechanism can be driven by a tension of the webbing for locking the webbing. Furthermore, the latching mechanism has the following advantages:

1. Preventing the slider from returning to the unlocked position when the webbing is locked by the latching mechanism: the slider has the bridge located at the side of the tongue assembly. The webbing passes through the bottom end of the bridge and is inserted through the slider and the tongue assembly. The tension of the shoulder belt acts on the bridge for directly driving the slider to move from the unlocked position of the tongue assembly to the locked position of the tongue assembly. The webbing is clamped and locked by the slider and the tongue assembly. A clamping force exerted on the webbing effectively prevents the slider from returning to the unlocked position. The slider can be restored to the unlocked position only by manually pushing the slider downwardly.

2. Preventing the lap belt of the webbing from being transferred to the shoulder belt of the webbing through the latching mechanism: as mentioned above, the tension of the shoulder belt acts on the bridge for driving the slider to move to the locked position of the tongue assembly, which makes the webbing clamped and locked by the slider and the tongue assembly. When the vehicle is riding on an uneven terrain, a tension exerted on the lap belt of the webbing changes as the occupant's body shakes and therefore decreases or vanishes. The tension of the shoulder belt of the webbing directly acts on the latching mechanism for locking the webbing. Therefore, the change of the tension of the lap belt cannot affect a locking effect of the latching mechanism on the webbing, thereby preventing the lap belt of the webbing from being transferred to the shoulder belt of the webbing through the latching mechanism, preventing the seat belt system from loosening the restraint on an occupant's body, and ensuring that the occupant's body stays restricted by the seat belt system.

Furthermore, the slider of the latching mechanism has a back plate. The back plate and the bridge are respectively located at two opposite sides of the tongue assembly. The lap belt of the webbing passes through a bottom end of the back plate. The tension of the shoulder belt of the webbing acts on the bridge for upwardly pushing the slider to the locked position of the tongue assembly. The tension of the lap belt of the webbing acts on the bottom end of the back plate for pushing the slider to the locked position of the tongue assembly, too. The webbing is clamped and locked by the slider and the tongue assembly.

Furthermore, a guide portion of the tongue assembly has a webbing receiving aperture and a clamping base located above the webbing receiving aperture. The slider has a webbing clamping bridge located below the bridge. The slider has an opening formed between the webbing clamping bridge and the bridge. The webbing clamping bridge of the slider has a webbing clamping surface. The webbing clamping surface is formed on the webbing clamping bridge, faces the tongue assembly, and has a clamping portion. The clamping portion is formed on the webbing clamping surface and is inserted into the webbing receiving aperture of the tongue assembly. The webbing passes through the bottom end of the bridge and is inserted through the opening of the slider and the webbing receiving aperture of the tongue assembly. When the tension of the shoulder belt acts on the bridge of the slider, the slider is upwardly pushed to the locked position. A horizontal clamping force acts on the webbing by the webbing clamping bridge of the slider and the clamping base of the tongue assembly. The webbing is clamped between the webbing clamping surface of the webbing clamping bridge and a vertical clamping surface of the clamping base for preventing the slider from returning to the unlocked position. When the slider is pushed to the locked position by the tension of the shoulder belt, the tension of the lap belt starts to act on the bottom end of the back plate for further pushing the slider to the locked position completely. In the meanwhile, a vertical clamping force is generated between the clamping portion of the webbing clamping bridge and a bottom end of the clamping base of the guide portion. On the basis of the horizontal clamping force, the vertical clamping force is further added, thereby securely clamping the webbing by the latching mechanism.

Furthermore, a top abutting edge of the slider has a middle section and two side sections. A distance between the middle section and the bridge is shorter than a distance between each one of the two side sections and the bridge. In the process of pushing the slider of the latching mechanism from the unlocked position to the locked position, the middle section and the two side sections of the top abutting edge abut against the webbing successively. The webbing clamping bridge and the clamping base of the tongue assembly gradually clamp and lock the webbing to avoid excessive concentration of a locking force caused by tightening and locking the webbing instantaneously upon encountering tension.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
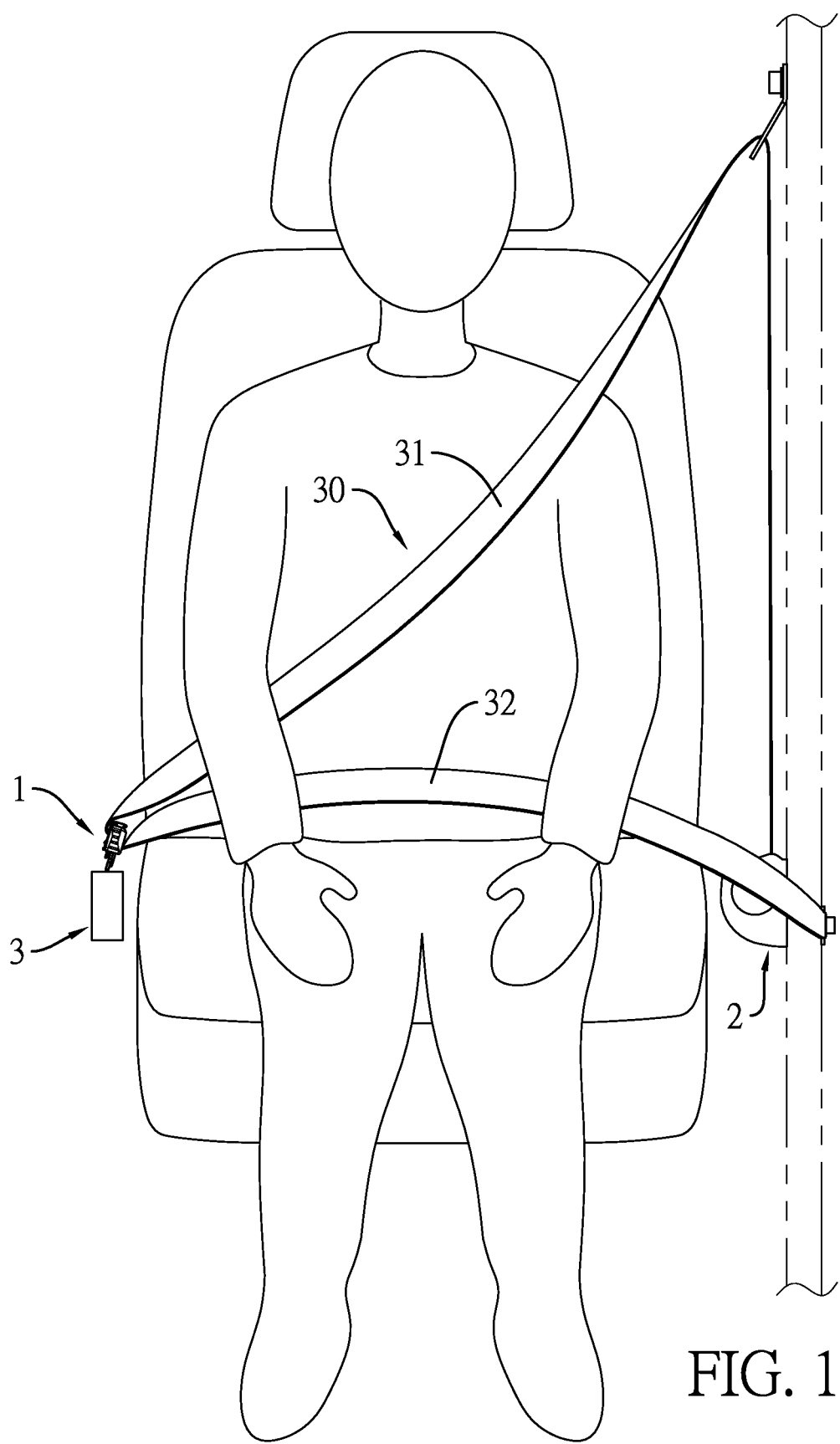
FIG. 1 is an operational front view of an embodiment of a latching mechanism in accordance with the present invention, showing the latching mechanism is applied to a three-point seat belt system.

With reference to FIG. 1, a latching mechanism 1 in accordance with the present invention is applied to be mounted on a seat belt system in a vehicle for protecting an occupant. For example, in a three-point seat belt system mounted in the vehicle adjacent to a seat, the latching mechanism 1 is mounted to the seat belt system and is connected to a webbing 30 of a retractor 2. The latching mechanism 1 can be connected to a buckle 3 beside the seat. The latching mechanism 1 can be locked or unlocked by the buckle 3. The webbing 30, the retractor 2, and the buckle 3 are conventional and well-known, and detailed description thereof is omitted.

With reference to FIGS. 1, 2, 6, 8, 10, and 13, in two embodiments of the latching mechanism 1, the latching mechanism 1 has a tongue assembly 10 and a slider 20. The slider 20 is slidably mounted on the tongue assembly 10 and is moveable upwardly and downwardly. The webbing 30 is inserted through the slider 20 and the tongue assembly 10 of the latching mechanism 1. The webbing 30 has a shoulder belt 31 and a lap belt 32 connected to the shoulder belt 31. The shoulder belt 31 and the lap belt 32 are respectively located at two opposite sides of the latching mechanism 1. The shoulder belt 31 of the webbing 30 is obliquely passed a shoulder and a front chest of the occupant sitting on the seat. The lap belt 32 is transversely passed a waist of the occupant sitting on the seat. The slider 20 of the latching mechanism 1 can be slid relative to the tongue assembly 10 by a tension of the webbing 30 for locking or unlocking the webbing 30.

With reference to FIGS. 2, 4, and 6 to 8, in the latching mechanism 1, the slider 20 can move between an unlocked position of the tongue assembly 10 and a locked position of the tongue assembly 10 located above the unlocked position of the tongue assembly 10. The slider 20 has a bridge 21 located at a side of the tongue assembly 10. The shoulder belt 31 of the webbing 30 passes through a bottom end of the bridge 21 and is inserted through the slider 20 and the tongue assembly 10. When the slider 20 is in the unlocked position of the tongue assembly 10, the latching mechanism 1 is capable of freely moving along the webbing 30. When a tension of the shoulder belt 31 acts on the bridge 21, the slider 20 moves from the unlocked position of the tongue assembly 10 to the locked position of the tongue assembly 10. The webbing 30 is clamped and locked by the slider 20 and the tongue assembly 10. The slider 20 can be manually operated to move from the locked position of the tongue assembly 10 to the unlocked position of the tongue assembly 10, thereby releasing the locked state of the webbing 30 between the slider 20 and the tongue assembly 10.

With reference to FIGS. 2 to 5, the tongue assembly 10 has an inserting portion 11 and a guide portion 12. The inserting portion 11 has a latching hole 111 formed through the inserting portion 11. The inserting portion 11 is configured to be inserted into and locked by the buckle 3. The guide portion 12 is connected to a top end of the inserting portion 11 and has a webbing receiving aperture 121 formed through the guide portion 12 and a clamping base 125 located above the webbing receiving aperture 121. The clamping base 125 has a vertical clamping surface 1251 formed on a side of the clamping base 125 that faces the bridge 21.

Figure 5:
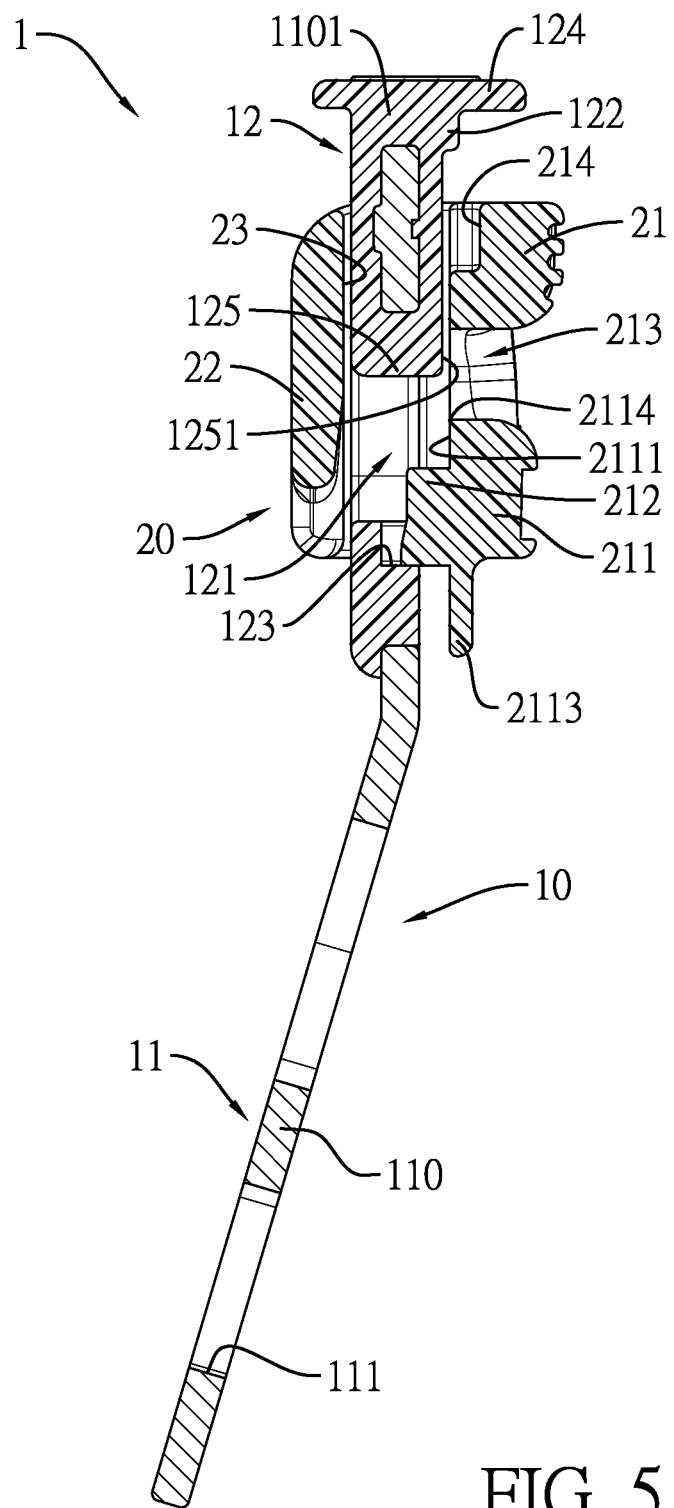
FIG. 5 is a cross sectional side view of the latching mechanism along line 5-5 in FIG. 4.

With reference to FIG. 5, the guide portion 12 of the tongue assembly 10 has a first block 122 and a second block 123. A sliding range of the slider 20 up and down is limited by the first block 122 and the second block 123.

With reference to FIGS. 2 to 5, the tongue assembly 10 has a plate 110 made from a rigid material and an overmolding 1101. The rigid material of the plate 110 is an iron-based material or other metallic material. The overmolding 1101 covers a top section of the plate 110 by molding and is made from a thermoplastic elastomer, such as plastic or rubber. The guide portion 12 is formed by the top section of the plate 110 and the overmolding 1101. A bottom section of the plate 110 is the inserting portion 11.

With reference to FIGS. 2 to 5, the guide portion 12 has a slider stop 124. The slider stop 124 is formed on and laterally protrudes out of a top end of the guide portion 12. The slider stop 124 is located above the slider 20 for limiting the slider 20 and preventing the slider 20 from escaping out of the guide portion 12 of the tongue assembly 10 when the tension of the webbing 30 acting on the slider 20 is too large.

Figure 2:
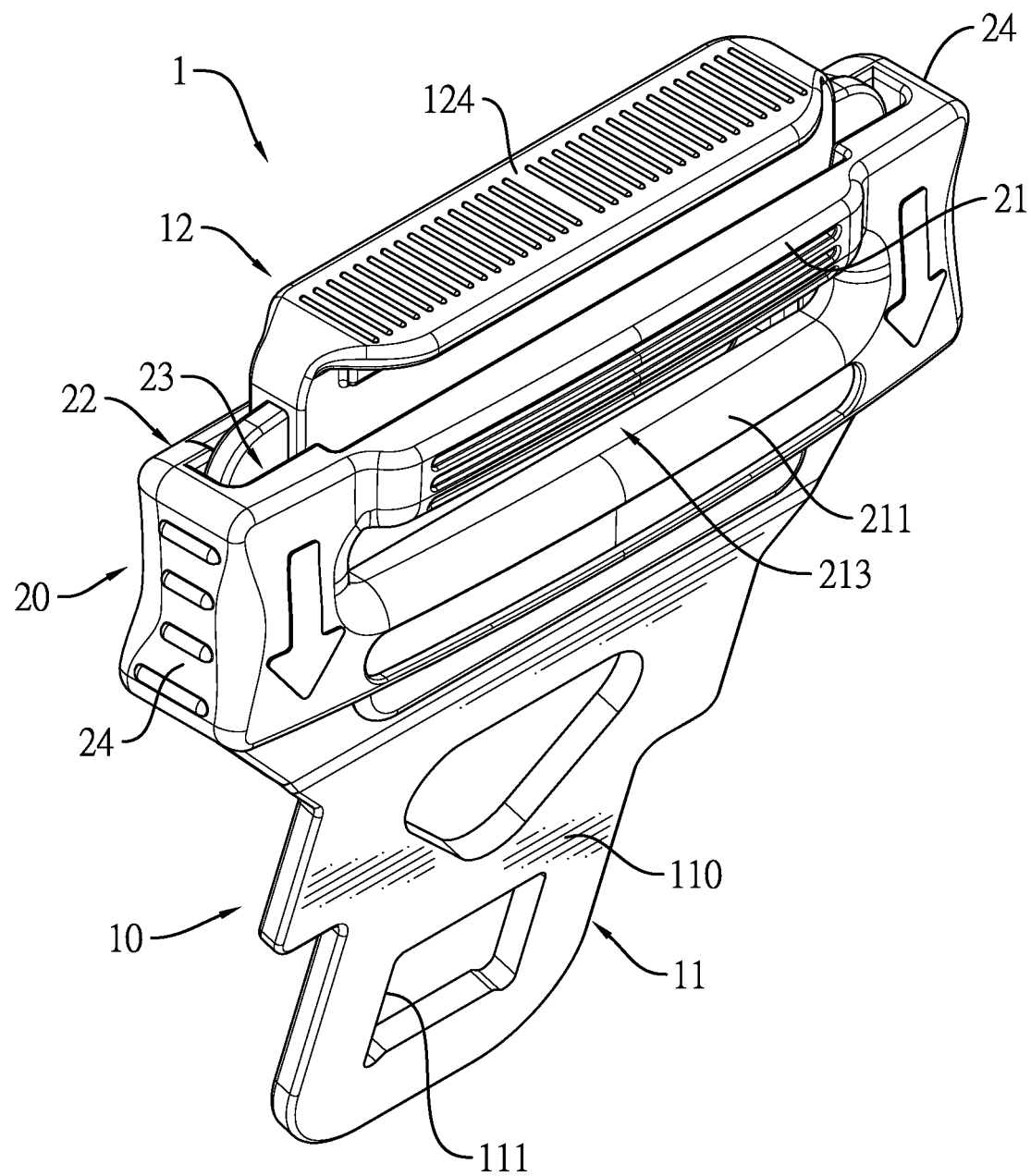
FIG. 2 is a perspective front view of the latching mechanism in FIG. 1.
Figure 3:
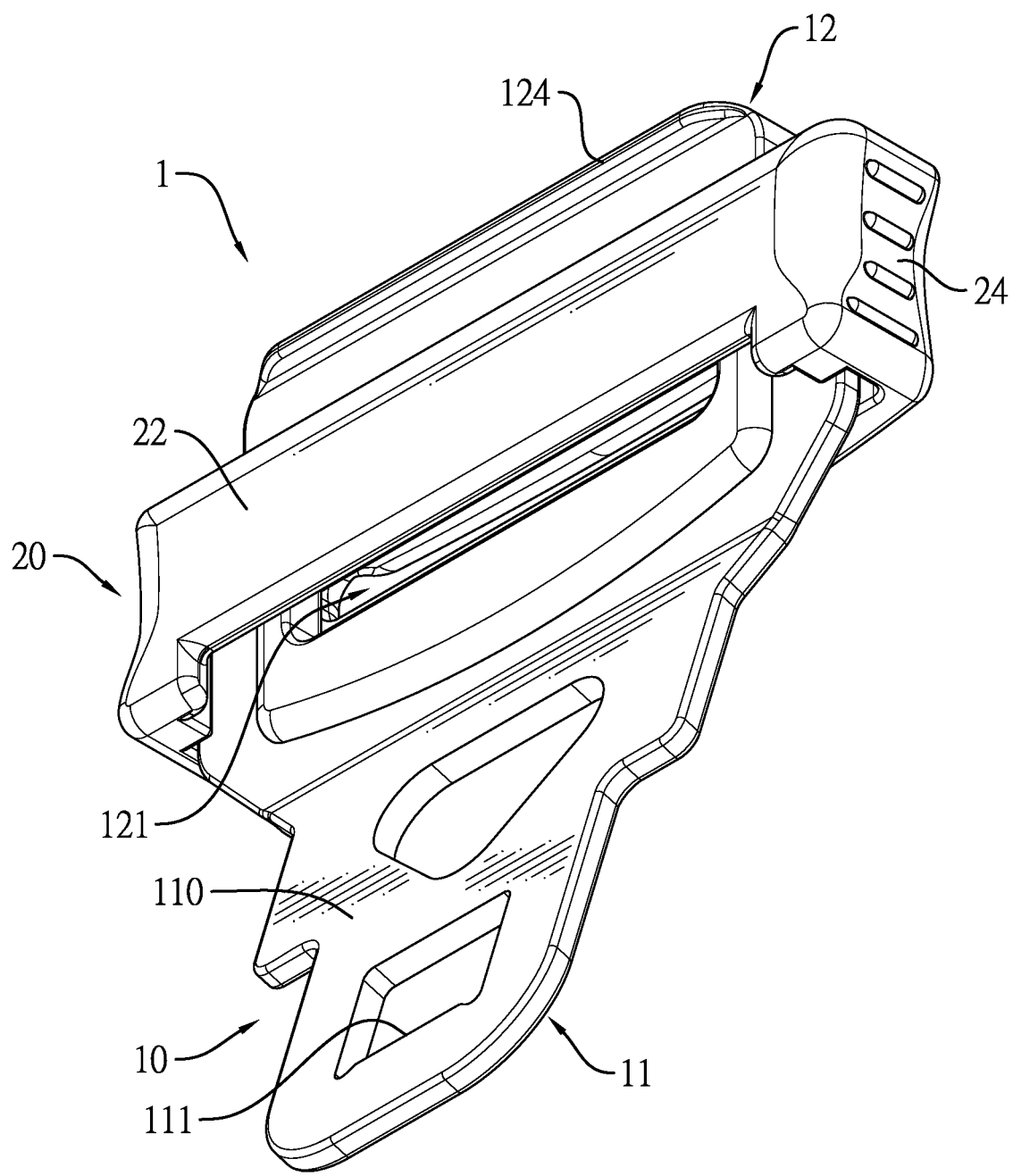
FIG. 3 is a perspective rear view of the latching mechanism in FIG. 2.
Figure 4:
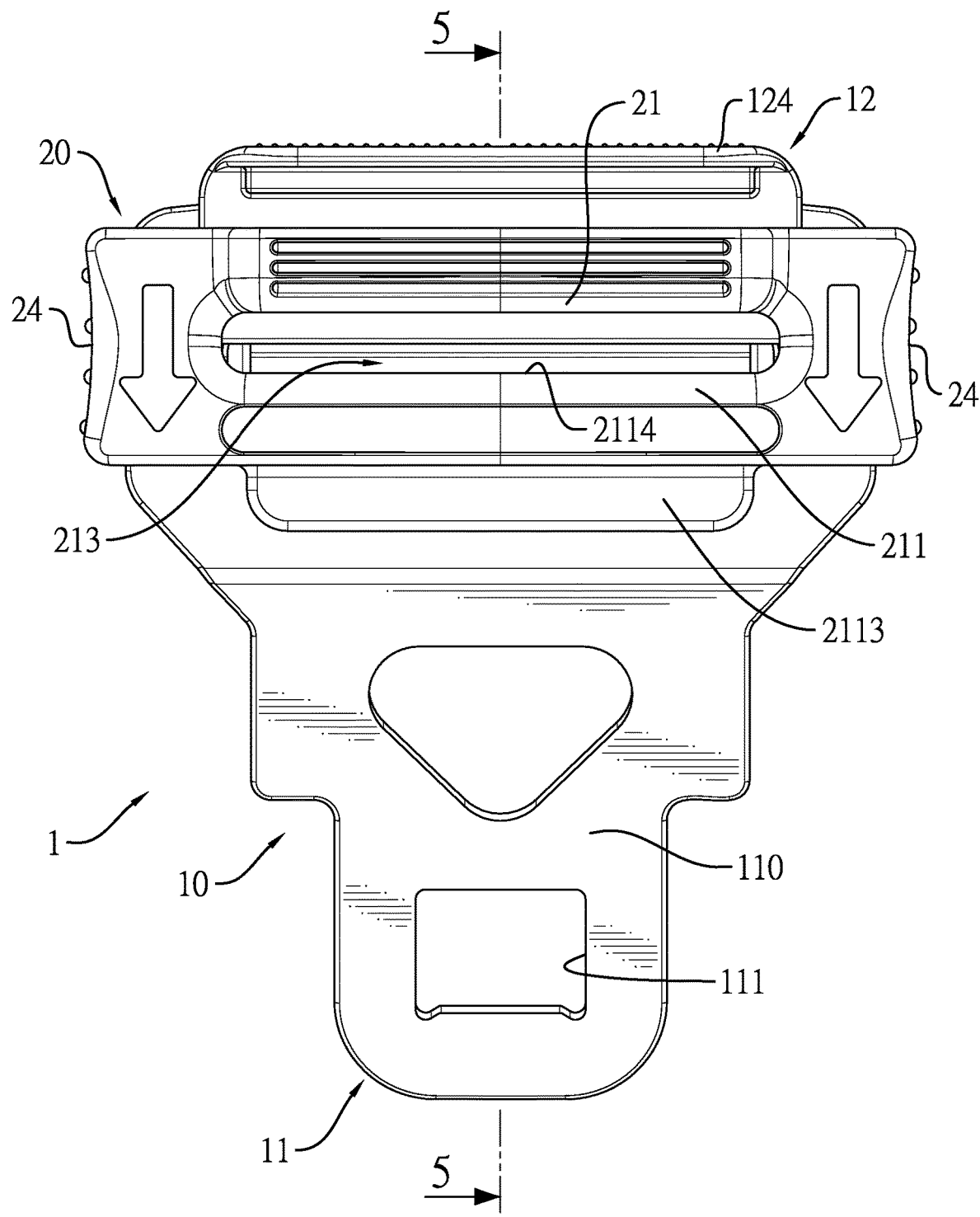
FIG. 4 is a front side view of the latching mechanism in FIG. 2.
Figure 8:
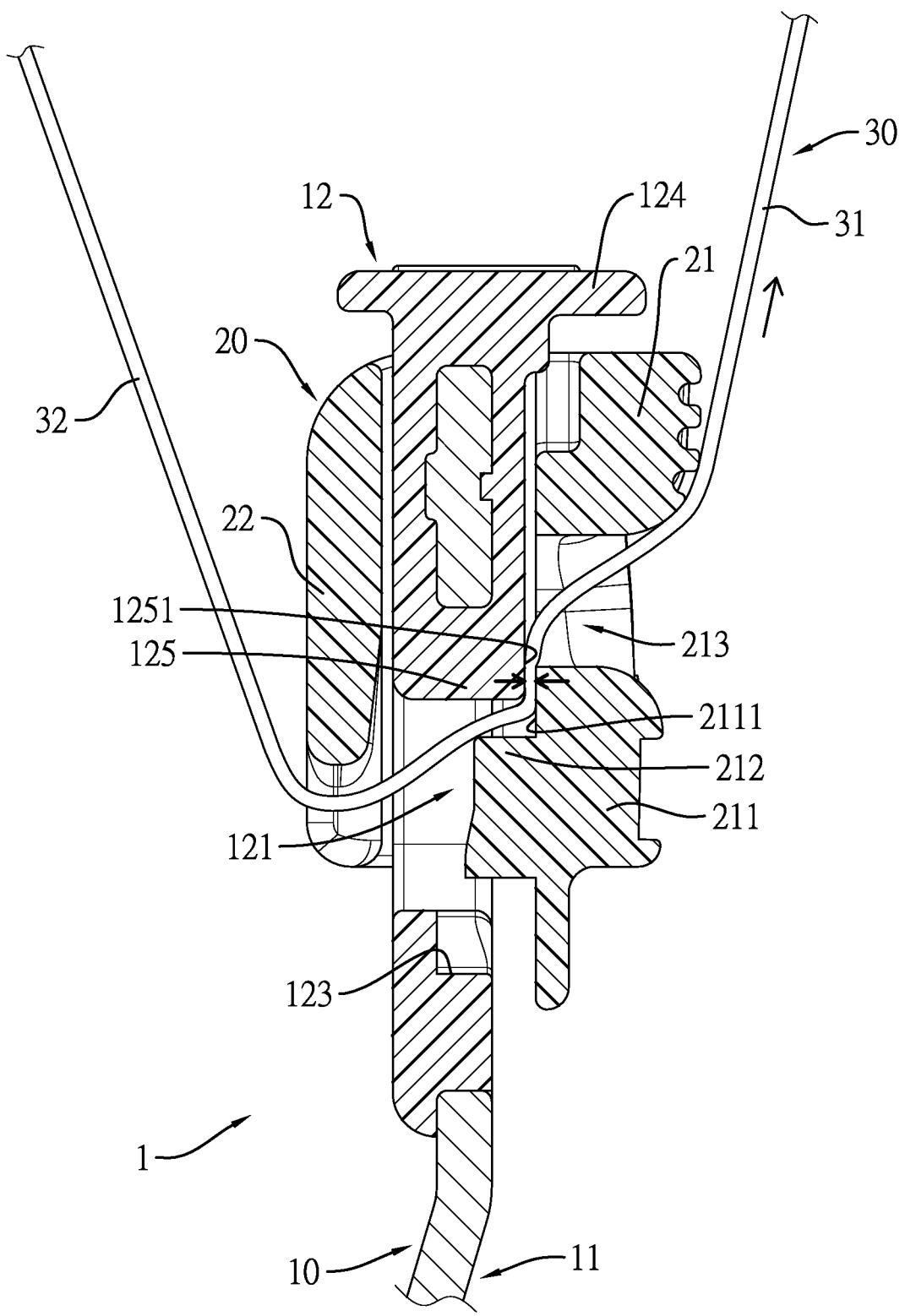
FIG. 8 is an operational view of the latching mechanism in FIG. 7, showing tension of a shoulder belt of the webbing is exerted on a bridge, and the slider moves from the unlocked position to a locked position.

With reference to FIGS. 2, 4, and 8, the slider 20 has a webbing clamping bridge 211 located below the bridge 21. The bridge 21 and the webbing clamping bridge 211 are located at the same side of the guide portion 12 of the tongue assembly 10. The slider 20 has an opening 213 formed between the webbing clamping bridge 211 and the bridge 21. The webbing 30 passes through the bottom end of the bridge 21 and is inserted through the opening 213 of the slider 20 and the webbing receiving aperture 121 of the tongue assembly 10. The webbing 30 is clamped and locked by the webbing clamping bridge 211 and the clamping base 125 of the tongue assembly 10.

With reference to FIGS. 2 to 9, the slider 20 has a back plate 22 located at another side of the tongue assembly 10 opposite to the bridge 21. After the webbing 30 is inserted through the opening 213 of the slider 20 and the webbing receiving aperture 121 of the tongue assembly 30 and passes below the back plate 22, the lap belt 32 of the webbing 30 passes through a bottom end of the back plate 22. The tension of the lap belt 32 acts on the bottom end of the back plate 22 for driving the slider 20 to move from the unlocked position of the tongue assembly 10 to the locked position of the tongue assembly 10. The webbing 30 is clamped and locked by the clamping base 125 of the tongue assembly 10 and the webbing clamping bridge 211 of the slider 20. The tension of any of the shoulder belt 31 and the lap belt 32 of the webbing 30 can drive the slider 20 to move to the locked position for locking the webbing 30.

Figure 9:
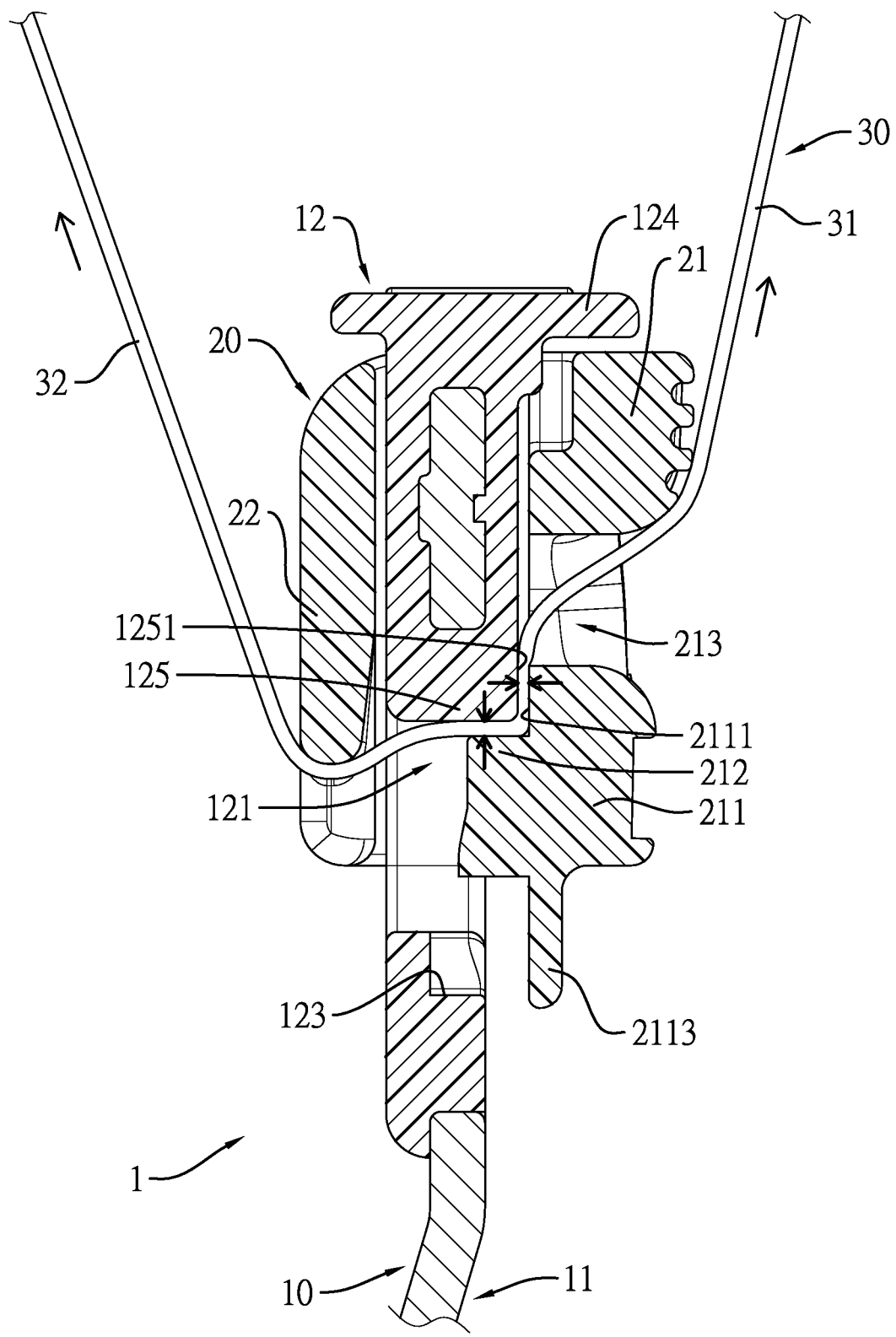
FIG. 9 is an operational view of the latching mechanism in FIG. 8, showing the slider is pushed into the locked position by the tensions of the shoulder belt and a lap belt of the webbing.

With reference to FIGS. 5, 8, and 9, the webbing clamping bridge 211 of the slider 20 has a webbing clamping surface 2111. The webbing clamping surface 2111 is formed on the webbing clamping bridge 211 and faces the tongue assembly 10. When the slider 20 is moved upwardly by the tension of the webbing 30, the webbing 30 is clamped and locked by a clamping force generated between the webbing clamping surface 2111 and the vertical clamping surface 1251 of the clamping base 125.

With reference to FIGS. 5 to 9, the webbing clamping surface 2111 has a clamping portion 212. The clamping portion 212 is formed on the webbing clamping surface 2111, is inserted into the webbing receiving aperture 121 of the tongue assembly 10, and may be an elongated body or a block. When the tension of the webbing 30 drives the slider 20 to move upwardly to the locked position, the clamping portion 212 can be combined with a bottom end of the clamping base 125 of the tongue assembly 10 to generate a vertical clamping force in an up-down direction for increasing the locking effect of the latching mechanism 1 on the webbing 30.

With reference to FIGS. 2 to 5, the slider is made from the thermoplastic elastomer. The bridge 21 and the webbing clamping bridge 211 are located at the same side of the guide portion 12 of the tongue assembly 10. The back plate 22 is located at another side of the guide portion 12 of the tongue assembly 10. The slider 20 has two side plates 24 formed on two sides of the slider 20 respectively. Each one of the two side plates 24 is connected to the bridge 21, the webbing clamping bridge 211, and the back plate 22. A channel 23 is formed through the slider 20 in an up-down direction. The slider 20 is slidably mounted around the guide portion 12 of the tongue assembly 10 and is moveable upwardly and downwardly.

With reference to FIG. 5, the guide portion 12 of the tongue assembly 10 has the first block 122 and the second block 123 for limiting the up-and-down sliding range of the slider 20. The first block 122 is located above the bridge 21 of the slider 20. The second block 123 is located below the webbing receiving aperture 121. The bridge 21 of the slider 20 has a recess 214 formed on a top of an inner surface of the bridge 21 that faces the guide portion 12. When the slider 20 is in the unlocked position of the tongue assembly 10, the clamping portion 212 abuts against the second block 123. When the slider 20 is located in the locked position of the tongue assembly 10, the first block 122 is inserted into the recess 214 of the bridge 21.

With reference to FIGS. 4, 5, and 9, the slider 20 has an extension 2113. The extension 2113 is formed on and downwardly protrudes from a bottom portion of the webbing clamping bridge 211. When the slider 20 moves upwardly, the extension 2113 covers a bottom portion of the webbing receiving aperture 121 of the tongue assembly 10 for preventing a foreign object from entering the webbing receiving aperture 121. In addition, with reference to FIGS. 2 to 4, an outer surface of the bridge 21 is a concave-convex surface, providing an anti-slip effect.

Figure 10:
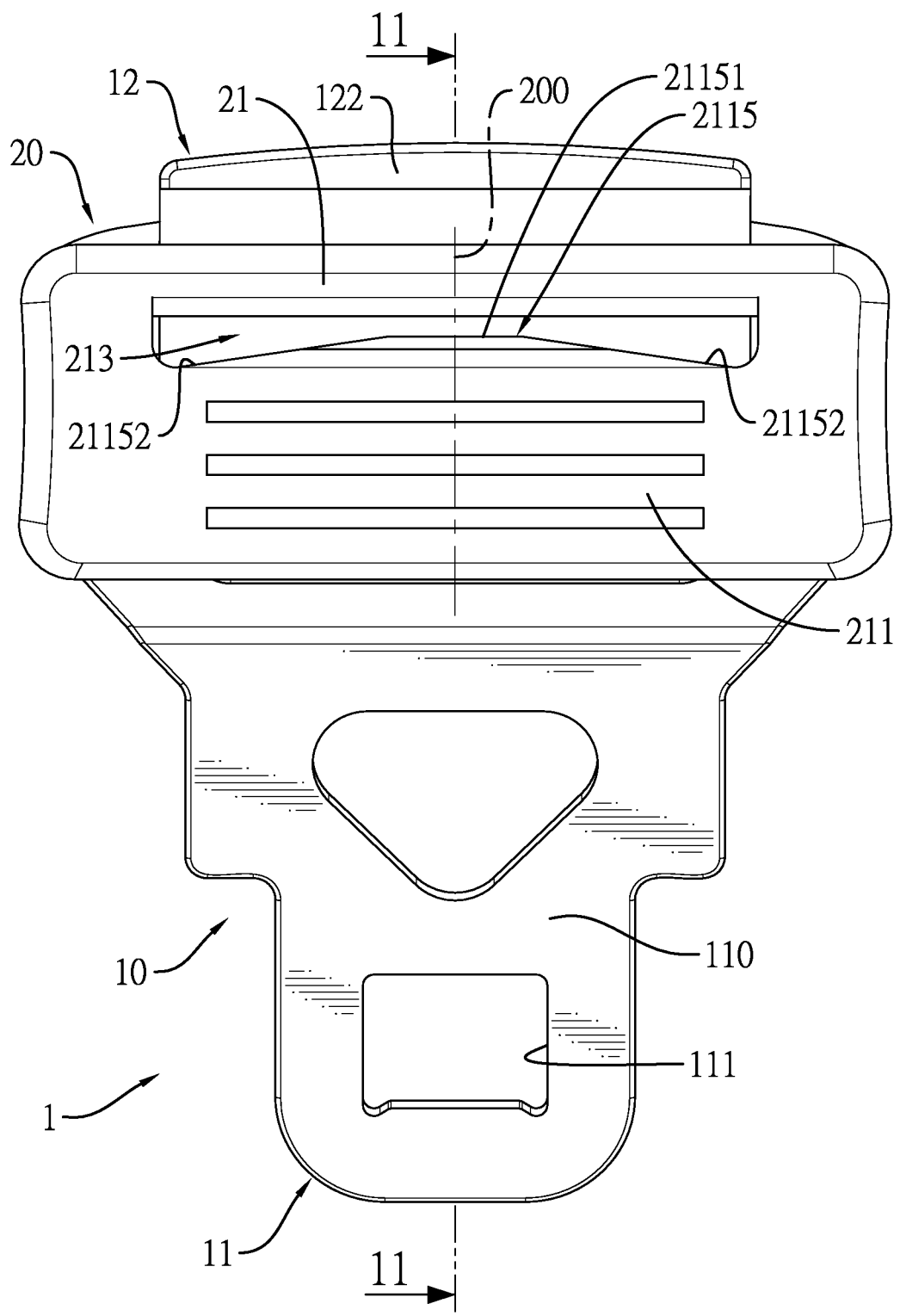
FIG. 10 is a front side view of another embodiment of a latching mechanism in accordance with the present invention.
Figure 11:
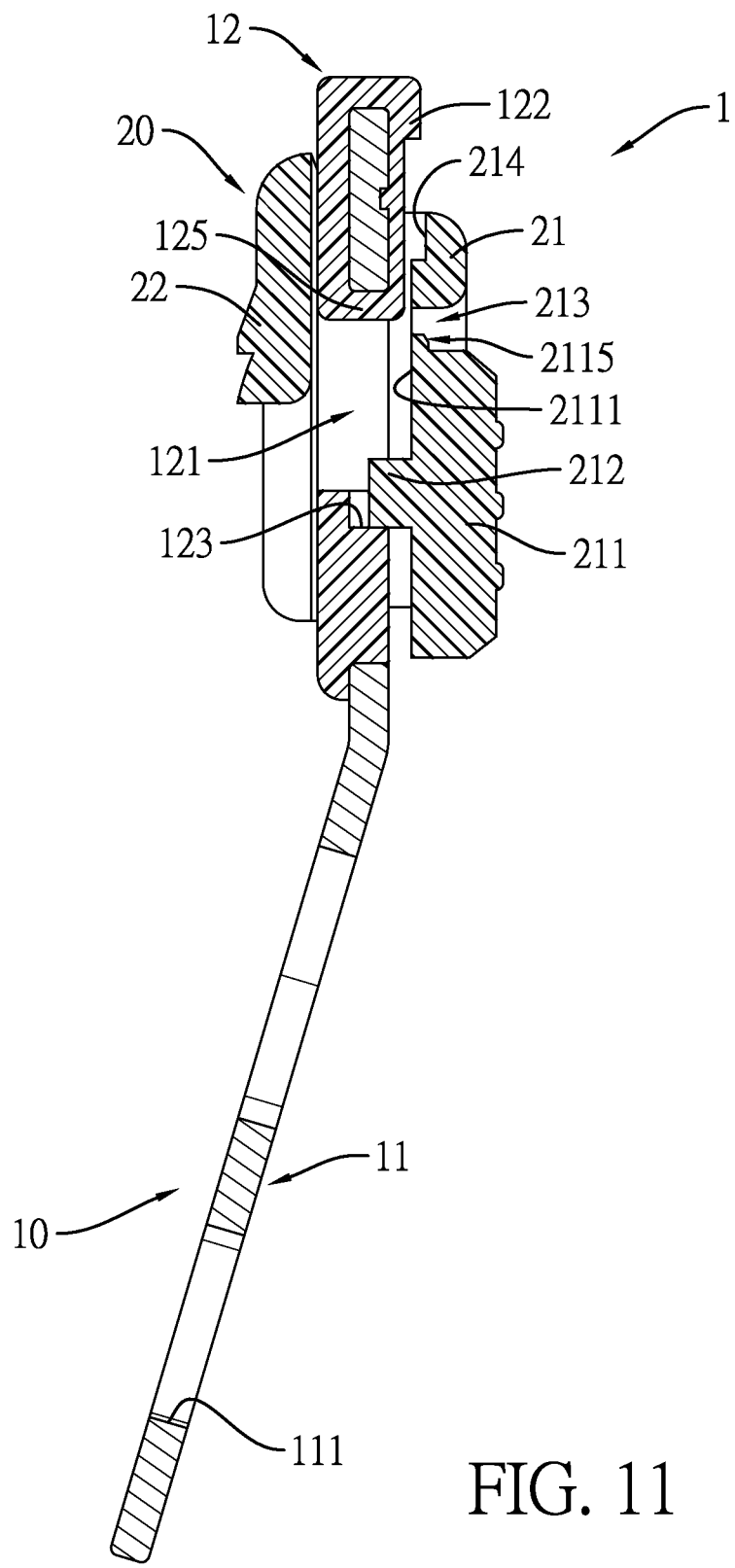
FIG. 11 is a cross sectional side view of the latching mechanism along line 11-11 in FIG. 10.

With reference to FIGS. 4 and 10, the webbing clamping bridge 211 has a top abutting edge 2114, 2115. The top abutting edge 2114, 2115 is formed on a top edge of the webbing clamping bridge 211 adjacent to the opening 213 of the slider 20 and is configured to abut against the webbing 30. With reference to FIG. 4, the top abutting edge 2114 is straight in a left-right direction. The straight top abutting edge 2114 abuts against the webbing 30 straightly. With reference to FIGS. 10 to 13, an imaginary centerline 200 is defined in a middle of the webbing clamping bridge 211 of the slider 20 and extends vertically. The top abutting edge 2115 has a middle section 21151 and two side sections 21152 located at two sides of the centerline 200. A distance between the middle section 21151 and the bridge 21 is shorter than a distance between each one of the two side sections 21152 and the bridge 21. The middle section 21151 and the two side sections 21152 of the top abutting edge 2115 abut against the webbing 30 successively. The webbing clamping bridge 211 and the clamping base 125 of the tongue assembly 10 gradually clamp and lock the webbing 30.

Figure 6:
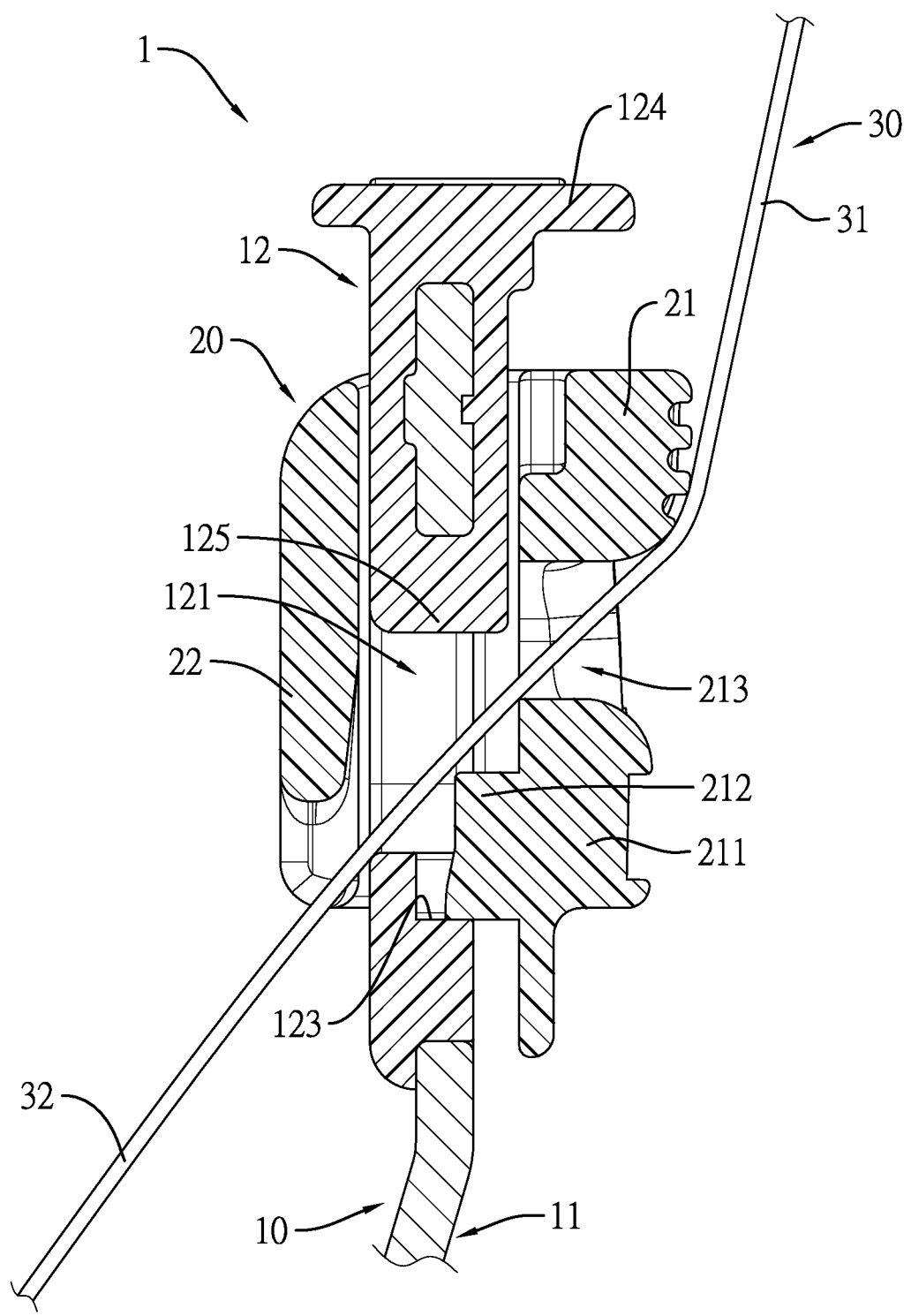
FIG. 6 is an enlarged and operational side view in partial section of the latching mechanism in FIG. 2, showing a webbing passes through the latching mechanism and is unlocked.
Figure 7:
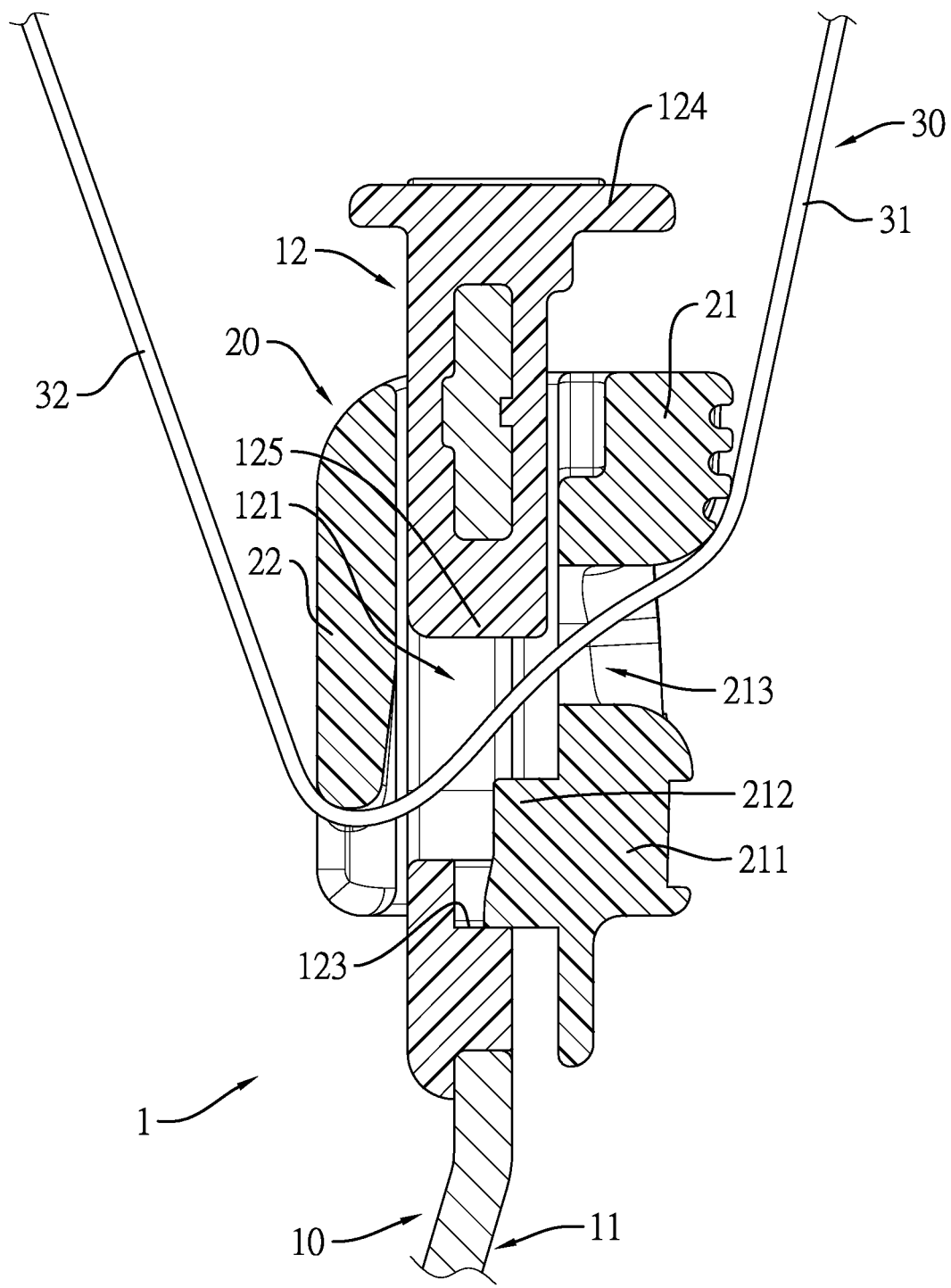
FIG. 7 is an operational view of the latching mechanism in FIG. 6, showing a slider in an unlocked position.

The latching mechanism is applied to the seat belt system, such as a three-point seat belt system of a motorized vehicle. With reference to FIGS. 1, 6, and 7, the latching mechanism 1 is mounted on the webbing 30 of the three-point seat belt system. When the latching mechanism 1 is not in use, the slider 20 of the latching mechanism 1 is located in the unlocked position, and the latching mechanism 1 can slide freely along the webbing 30. When the occupant sits on the seat and fastens the webbing 30, the latching mechanism 1 is inserted into the buckle 3 mounted beside the seat, and the shoulder belt 31 of the webbing 30 is obliquely passed the shoulder and the front chest of the occupant. The lap belt 32 is transversely passed the waist of the occupant. The slider 20 is located in the unlocked position, so the occupant can adjust the webbing 30 to a suitable tightness to fit the occupant's body.

With reference to FIGS. 1, 7, and 9, when the shoulder belt 31 of the webbing 30 is pulled, the tension of the shoulder belt 31 acts on the bridge 21 of the slider 20, and the slider 20 is pushed upwardly from the unlocked position to the locked position. A horizontal clamping force generated between the webbing clamping bridge 211 of the slider 20 and the clamping base 125 of the tongue assembly 10 is exerted on the webbing 30. The webbing 30 is clamped between the webbing clamping surface 2111 of the webbing clamping bridge 211 and the vertical clamping surface 1251 of the clamping base 125. The horizontal clamping force exerted on the webbing 30 can effectively prevent the slider 20 from returning to the unlocked position. The slider 20 is upwardly pushed to the locked position, and the webbing 30 is clamped by the slider 20 and the tongue assembly 10.

When the vehicle is riding on an uneven terrain, the tension exerted on the lap belt 32 of the webbing 30 changes with the shaking of the occupant's body, decreases or vanishes. The tension of the shoulder belt 31 of the webbing 30 directly acts on the latching mechanism 1 to lock the webbing 30. The change of the tension of the lap belt 31 of the webbing 30 cannot affect the locking effect of the latching mechanism 1 on the webbing 30, preventing a part of the lap belt 32 of the webbing 30 from being transferred to the shoulder belt 31 of the webbing 30 through the latching mechanism 1, thereby ensuring that the occupant's body stays restricted by the seat belt system.

Figure 12:
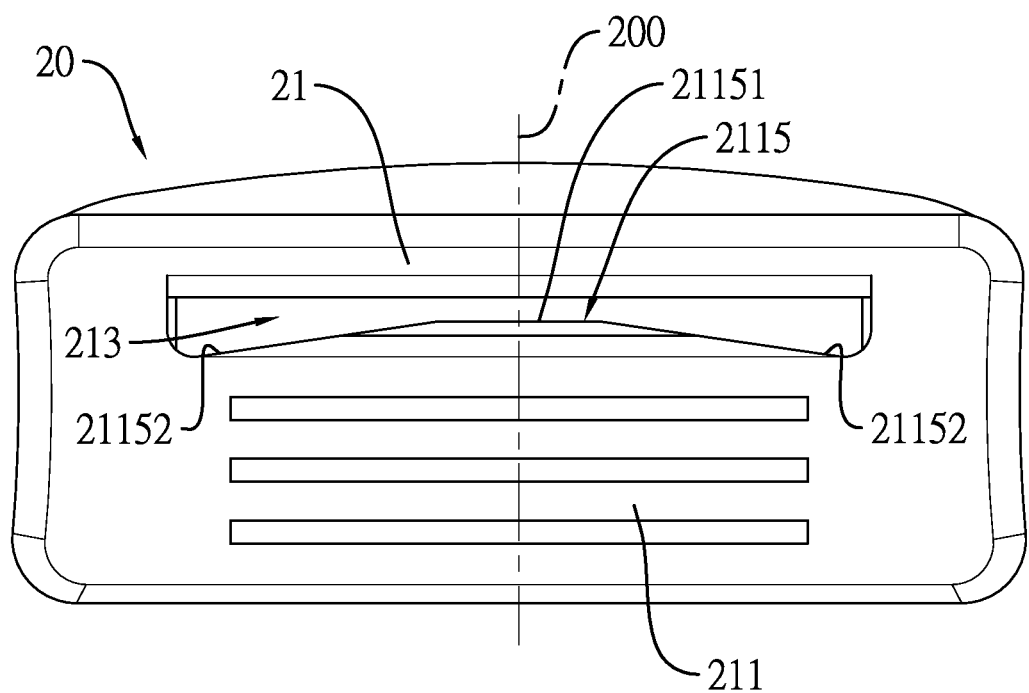
FIG. 12 is a front side view of a slider of the latching mechanism in FIG. 10.
Figure 13:
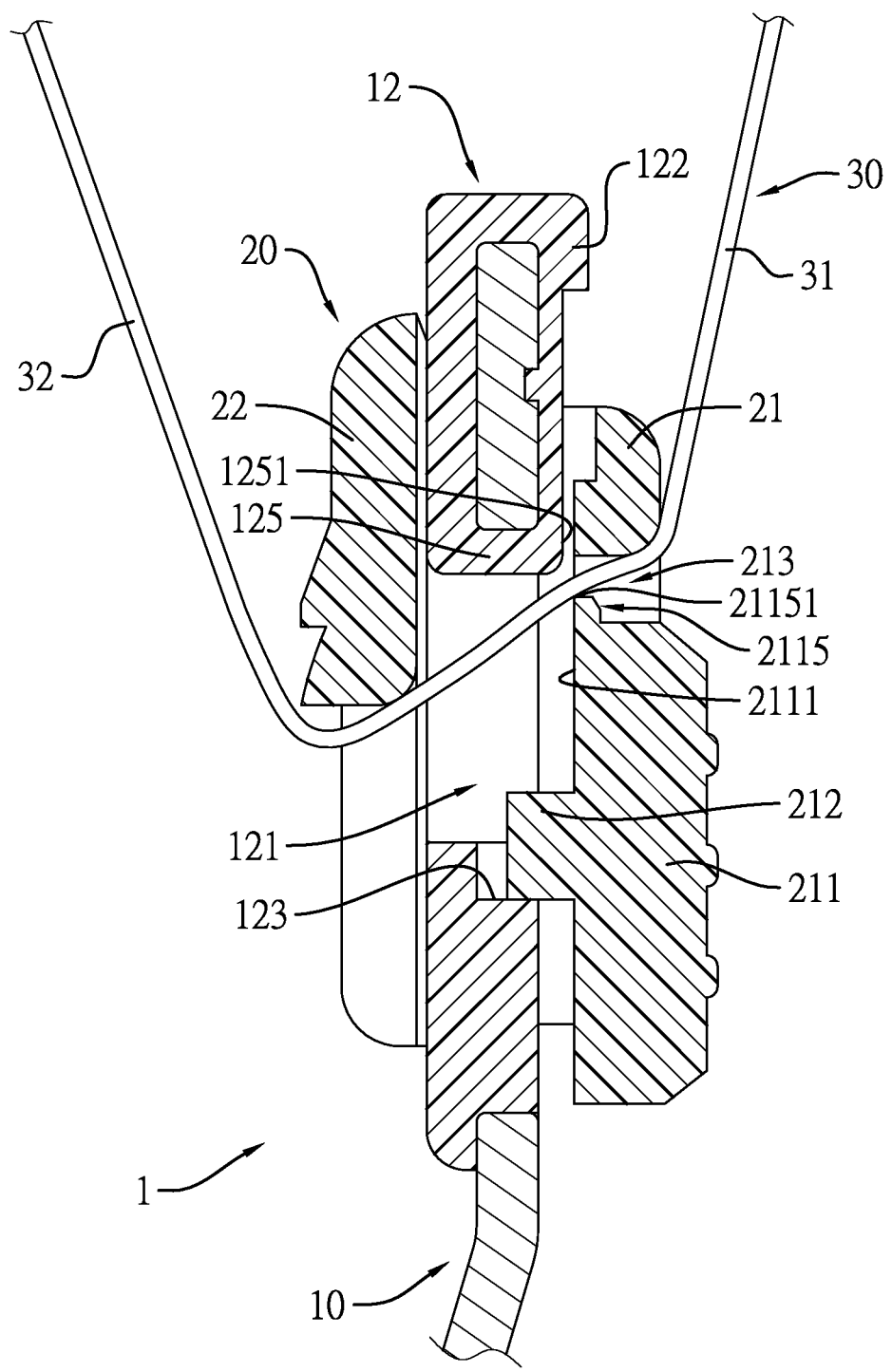
FIG. 13 is an operational view in partial section of the latching mechanism in FIG. 10, showing the slider is in an unlocked position.
Figure 14:
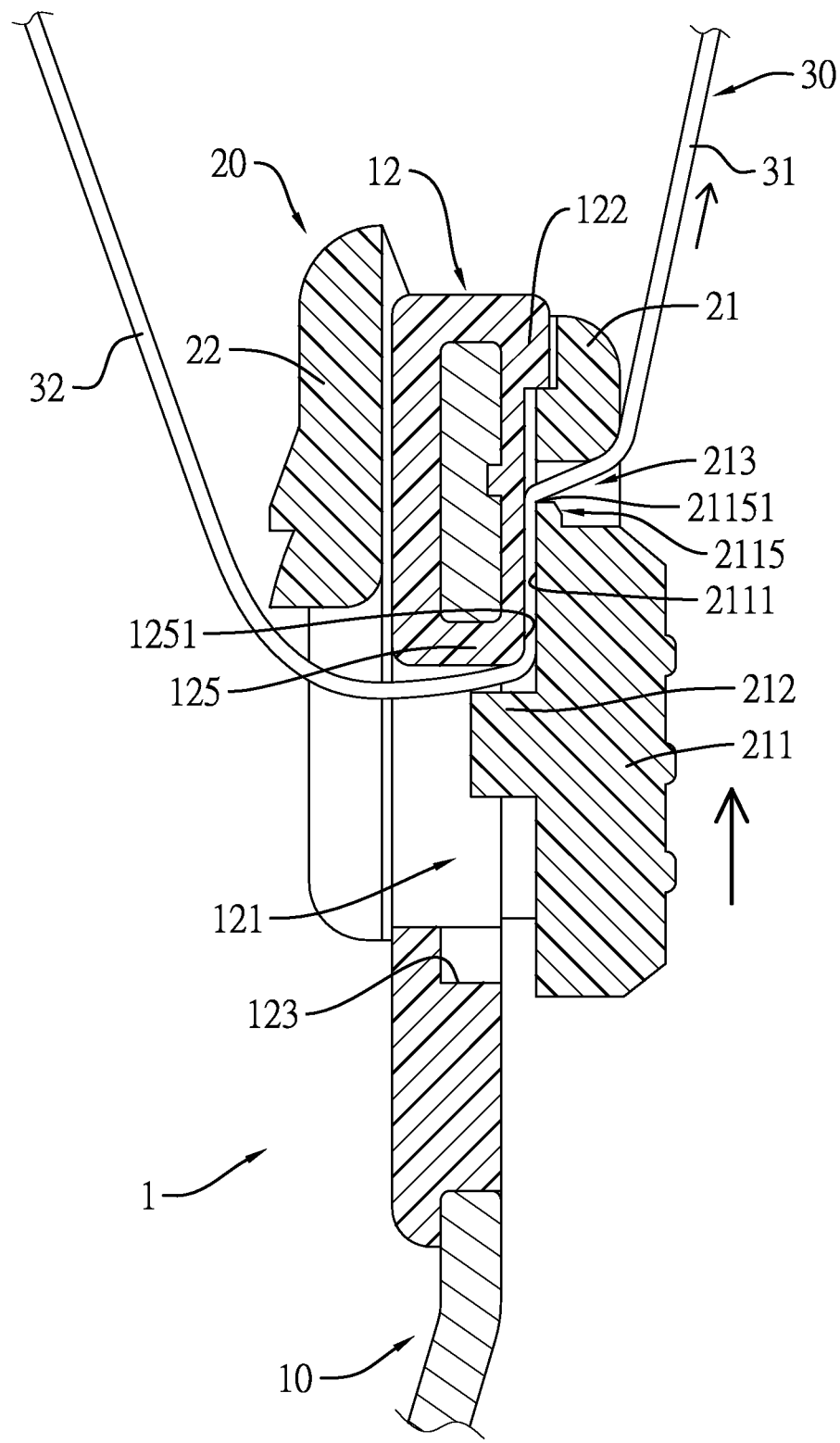
FIG. 14 is an operational view of the latching mechanism in FIG. 13, showing the slider is pushed upwardly to a locked position.

With reference to FIGS. 12, 13, and 14, the top abutting edge 2115 of the webbing clamping bridge 211 has the middle section 21151 and the two side sections 21152. The distance between the middle section 21151 and the bridge 21 is shorter than a distance between each one of the two side sections 21152 and the bridge 21. In the process of upwardly pushing the slider 20 of the latching mechanism 1 from the unlocked position to the locked position, the middle section 21151 and the two side sections 21152 of the top abutting edge 2115 successively abut against the webbing 30. The webbing clamping bridge 211 and the clamping base 125 of the tongue assembly 10 gradually clamp and lock the webbing 30 to avoid excessive concentration of the locking force generated when the webbing 30 is tightened and locked instantaneously upon encountering tension.

With reference to FIGS. 1, and 7 to 9, when the tension of the shoulder belt 31 or the tension of the lap belt 32 increases, the slider 20 is pushed upwardly to the locked position by the tension of the webbing 30. The vertical clamping force is generated between the clamping portion 212 located at the webbing clamping surface 2111 in the slider 20 and the bottom end of the clamping base 125 of the tongue assembly 10. On the basis of the horizontal clamping force, the vertical clamping force is further added, so that the webbing 30 can be clamped completely by the latching mechanism 1. To return the slider 20 to the unlocked position for unlocking the webbing 30, the occupant only needs to manually push the slider 20 downward.

What is claimed is:

1. A latching mechanism applied to be mounted on a webbing of a seat belt system, the latching mechanism comprising:
   a tongue assembly; and
   a slider slidably mounted on the tongue assembly, being moveable upwardly and downwardly, and having a bridge located at a side of the tongue assembly;
   wherein the webbing passes through a bottom end of the bridge and is inserted through the slider and the tongue assembly; the webbing has a shoulder belt located at the side, which has the bridge thereon, of the latching mechanism; when the slider is located in an unlocked position of the tongue assembly, the latching mechanism is capable of freely moving along the webbing; a tension of the shoulder belt acts on the bridge for driving the slider to move from the unlocked position of the tongue assembly to a locked position of the tongue assembly, such that the webbing is clamped and locked by the slider and the tongue assembly,
   wherein the tongue assembly has an inserting portion and a guide portion connected to a top end of the inserting portion; the guide portion has
      a webbing receiving aperture formed through the guide portion; and
      a clamping base located above the webbing receiving aperture; and the slider has a webbing clamping bridge located below the bridge; the bridge and the webbing clamping bridge are located at the same side of the guide portion of the tongue assembly; the slider has an opening formed between the webbing clamping bridge and the bridge; the webbing passes through the bottom end of the bridge and is inserted through the opening of the slider and the webbing receiving aperture of the tongue assembly; the webbing is clamped and locked by the webbing clamping bridge and the clamping base;

the webbing clamping bridge of the slider has a webbing clamping surface; the webbing clamping surface is formed on the webbing clamping bridge, faces the tongue assembly, and has a clamping portion; the clamping portion is formed on the webbing clamping surface and is inserted into the webbing receiving aperture of the tongue assembly; the webbing clamping surface and the clamping portion exert respective clamping forces with the clamping base of the tongue assembly, such that the webbing is clamped between the webbing clamping surface and the clamping base and between the clamping portion and the clamping base, the respective clamping forces exerted in multiple directions.

2. The latching mechanism as claimed in claim 1, wherein when the tension in the shoulder belt causes a movement of the slider, the webbing is locked and clamped by a vertical clamping surface of the clamping base and a webbing clamping surface of the webbing clamping bridge of the slider.

3. The latching mechanism as claimed in claim 1, wherein the slider has a back plate located at another side, which is opposite to the bridge, of the tongue assembly; the webbing has a lap belt connected to the shoulder belt and located at a side, which has the back plate thereon, of the latching mechanism and passes through a bottom end of the back plate; a tension of the lap belt acts on the bottom end of the back plate for driving the slider to move from the unlocked position of the tongue assembly to the locked position of the tongue assembly, such that the webbing is clamped and locked by the slider and the tongue assembly.

4. The latching mechanism as claimed in claim 1, wherein the slider has a back plate located at another side, which is opposite to the bridge, of the tongue assembly; the webbing passes below the back plate; the webbing has a lap belt connected to the shoulder belt and located at a side, which has the back plate thereon, of the latching mechanism; a tension of the lap belt acts on the back plate for driving the slider to move from the unlocked position of the tongue assembly to the locked position of the tongue assembly, such that the webbing is clamped and locked by the webbing clamping bridge and the clamping base.

5. The latching mechanism as claimed in claim 4, wherein the webbing clamping bridge has a top abutting edge formed on a top edge of the webbing clamping bridge adjacent to the opening of the slider and being straight in a left-right direction.

6. The latching mechanism as claimed in claim 4, wherein the webbing clamping bridge has a top abutting edge formed on a top edge of the webbing clamping bridge adjacent to the opening of the slider and having a middle section and two side sections; the middle section is located between the two side sections, and a distance between the middle section and the bridge is shorter than a distance between each one of the two side sections and the bridge.

7. The latching mechanism as claimed in claim 1, wherein the guide portion of the tongue assembly has a first block and a second block; the first block and the second block are formed on the guide portion; the second block is located below the first block; a sliding range of the slider up and down is limited by the first block and the second block.

8. The latching mechanism as claimed in claim 4, wherein the guide portion of the tongue assembly has a first block and a second block; the first block and the second block are formed on the guide portion; the second block is located below the first block; a sliding range of the slider up and down is limited by the first block and the second block.

9. The latching mechanism as claimed in claim 1, wherein the guide portion of the tongue assembly has a first block and a second block both formed on the guide portion; the first block is located above the bridge; the second block is located below the webbing receiving aperture; the bridge of the slider has a recess formed on a top of an inner surface of the bridge that faces the guide portion; when the slider is located in the unlocked position of the tongue assembly, the clamping portion abuts against the second block; when the slider is located in the locked position of the tongue assembly, the first block is inserted into the recess of the bridge.

10. The latching mechanism as claimed in claim 1, wherein the slider has an extension formed on and downwardly protruding from a bottom portion of the webbing clamping bridge; when the slider moves upwardly, the extension covers a bottom portion of the webbing receiving aperture of the tongue assembly.

11. The latching mechanism as claimed in claim 4, wherein the slider has an extension formed on and downwardly protruding from a bottom portion of the webbing clamping bridge; when the slider moves upwardly, the extension covers a bottom portion of the webbing receiving aperture of the tongue assembly.

* * * * *